US010258893B2

(12) United States Patent
Freedman et al.

(10) Patent No.: US 10,258,893 B2
(45) Date of Patent: Apr. 16, 2019

(54) ANNULAR MOTION SIMULATION AMUSEMENT PARK ATTRACTION

(71) Applicant: Universal City Studios LLC, Universal City, CA (US)

(72) Inventors: Daniel Matthew Freedman, Ocoee, FL (US); Nathanael Gordon White, Orlando, FL (US); Paula Stenzler, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/852,685

(22) Filed: Dec. 22, 2017

(65) Prior Publication Data
US 2018/0304162 A1 Oct. 25, 2018

Related U.S. Application Data

(60) Provisional application No. 62/489,895, filed on Apr. 25, 2017.

(51) Int. Cl.
*A63G 31/16* (2006.01)
*A63G 7/00* (2006.01)
*A63G 21/20* (2006.01)
*A63G 31/08* (2006.01)
(Continued)

(52) U.S. Cl.
CPC ............... *A63G 21/20* (2013.01); *A63G 7/00* (2013.01); *A63G 31/08* (2013.01); *A63G 31/14* (2013.01); *A63G 31/16* (2013.01); *G06T 19/006* (2013.01)

(58) Field of Classification Search
CPC .......... A63G 7/00; A63G 21/00; A63G 21/22; A63G 31/00; A63G 31/16

USPC ...... 472/29, 39, 37, 59–61, 130; 104/53, 77, 104/78; 434/55

See application file for complete search history.

(56) References Cited

U.S. PATENT DOCUMENTS

| 5,489,212 A | * | 2/1996 | Yoshimoto | ............. | A63G 31/16 434/34 |
| 5,490,784 A | * | 2/1996 | Carmein | ................ | A63B 22/02 434/29 |
| 5,551,920 A | | 9/1996 | Ogden et al. | | |

(Continued)

FOREIGN PATENT DOCUMENTS

| CN | 101058033 | 10/2007 |
| DE | 20217754 U1 | 3/2003 |

(Continued)

OTHER PUBLICATIONS

Motorcycle Roller Coaster—The Gentleman Racer; http://www.thegentlemanracer.com/2012/07/motorcycle-rollercoaster.html Jul. 2012.

(Continued)

*Primary Examiner* — Kien Nguyen
(74) *Attorney, Agent, or Firm* — Fletcher Yoder, P.C.

(57) ABSTRACT

A simulator ride may include an annular structure forming at least a partial annulus on which a path is implemented. Additionally, the simulator ride may include a headset with a display designed to be worn by a passenger. A passenger support system may be coupled to the path of the annular structure and designed to move along the path and rotate about a center axis of the annular structure when in operation. Additionally, the annular structure may be configured to be articulated in one or more degrees of freedom.

19 Claims, 8 Drawing Sheets

(51) Int. Cl.
*A63G 31/14* (2006.01)
*G06T 19/00* (2011.01)

(56) References Cited

U.S. PATENT DOCUMENTS

| | | | |
|---|---|---|---|
| 5,688,178 A | 11/1997 | Emrie | |
| 5,979,333 A * | 11/1999 | Houben | A63G 21/22 104/63 |
| 6,042,382 A | 3/2000 | Halfhill | |
| 8,066,576 B2 * | 11/2011 | Threlkel | A63G 7/00 104/53 |
| 8,453,576 B2 | 6/2013 | Roodenburg et al. | |
| 9,486,135 B1 | 11/2016 | Fram | |
| 2005/0001466 A1 | 1/2005 | Zambelli et al. | |
| 2008/0051205 A1 | 2/2008 | Roodenburg et al. | |
| 2010/0236444 A1 | 9/2010 | Blonk et al. | |
| 2016/0346704 A1 | 12/2016 | Wagner | |

FOREIGN PATENT DOCUMENTS

| | | |
|---|---|---|
| EP | 2253362 A1 | 11/2010 |
| RU | 2264838 C1 | 11/2005 |
| WO | 2004073818 A1 | 9/2004 |
| WO | 2007055572 A1 | 5/2007 |

OTHER PUBLICATIONS

Canada's Wonderland debuts new Skyhawk ride this weekend | Toronto Star https://www.thestar.com/news/insight/2016/05/01/canadas-wonderland-... May 1, 2016.

MotoGP Motorcycle Racing; https://www.videoamusement.com/racing-simulators-rental/motogp-motorcycle-racing/ Accessed on Oct. 10, 2017.

Plane Rudder; http://www.start-flying.com/new%20site/controlling_aircraft.htm—Accessed on Oct. 10, 2017.

PCT/US2018/028931 Invitation to Pay Additional Fees dated Jul. 16, 2018.

* cited by examiner

ANNULAR MOTION SIMULATION AMUSEMENT PARK ATTRACTION

CROSS-REFERENCE TO RELATED APPLICATIONS

This application claims priority from and the benefit of U.S. Provisional Application Ser. No. 62/489,895, entitled "MOTION SIMULATED AMUSEMENT PARK ATTRACTION," filed Apr. 25, 2017, which is hereby incorporated by reference in its entirety.

BACKGROUND

The present disclosure relates generally to the field of amusement parks. More specifically, embodiments of the present disclosure relate to methods and equipment utilized to provide amusement park experiences.

This section is intended to introduce the reader to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various amusement rides have been created to provide passengers with unique motion and visual experiences. In one example, roller coasters and theme rides can be implemented with multi-passenger vehicles that travel along a fixed path. In addition to the excitement created by the speed or change in direction of the vehicles as they move along the path, the vehicles themselves may generate special effects, e.g., sound and/or motion effects. Although a repeat rider may be familiar with the general path of the ride, the special effects may create interest during second and subsequent rides. In another example, certain rides may be implemented with projection elements to create varying scenery and movement as the passenger vehicles travel along the path. However, it is now recognized that regardless of such enhancements to these passenger vehicle rides, the rider in the passenger vehicle may not feel immersed in the ride. For example, the rider is generally aware of being within a ride because of the presence of other passengers in the multi-passenger vehicle as well as being aware of the confines of the vehicle itself. Such awareness of the ride may prevent the ride experience from being a more accurate simulation. Accordingly, there is a need for an improved amusement ride vehicle that simulates certain experiences.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a simulator ride may include an annular structure forming at least a partial annulus on which a path is implemented. Additionally, the simulator ride may include a headset with a display designed to be worn by a passenger. A passenger support system may be coupled to the path of the annular structure and designed to move along the path and rotate about a center axis of the annular structure when in operation. The passenger support system may include a clamp style leg restraint and a rear restraint. Additionally, the annular structure may be configured to be articulated in one or more degrees of freedom by the simulator ride.

In accordance with another embodiment, an amusement ride may include an annular structure and a ride base designed to support the annular structure. The ride base may also be designed to articulate the annular structure in one or more degrees of motion. The amusement ride may also include a passenger support system coupled within the annular structure, and designed to rotate about the center axis of the annular structure. Additionally, the passenger support system may be designed to maintain a passenger during rotation of the passenger support system.

In accordance with another embodiment, a multi-passenger simulator ride may include multiple annular structures and corresponding headsets designed to receive signals and display images based on the signals. The multi-passenger simulator ride may also include multiple corresponding passenger support systems, each coupled to one of the annular structures. Additionally, the passenger support systems may rotate within the annular structures about a center axis of the annular structures. Each of the passenger support systems may include a leg restraint and a rear restraint. Each leg restraint may be designed to maintain a passenger against the rear restraint.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure provides an amusement/simulator ride that may include a passenger support system implemented without an enclosed ride vehicle or other passenger-enclosing structure. In this manner, the passenger may feel a more accurate or realistic simulated experience. The amusement ride, as provided herein, may be implemented as an annular structure containing a passenger support system within. The annular structure may allow passengers to be spun around an axis of the structure to simulate various physical effects (e.g., feelings of flipping, somersaulting, flying, accelerating, etc.). Additionally, the annular structure may be implemented alone or in an assembly of multiple annular structures.

Movement of the passenger support system, and thus, the passenger, within the annular structure, causes the sensation of airflow around the passenger's body (e.g., arms and legs) and may allow the passenger a heightened amusement ride experience. Additionally, relatively minor movement of the passenger support system may create additional forces on the rider's body due, in part, to the distribution of gravitational forces. The combination of physical effects such as airflow and g-forces, along with visual effects such as a visual effect device, screen, or facade may provide the passenger with an immersive amusement ride experience.

While the disclosed embodiments are generally described in the context of amusement park rides, it should be understood that the simulator as provided herein may also be used in other contexts. For example, the simulator may be used for flight training, driving training, sports training (e.g., gymnastics, ice skating, etc.), or therapy purposes.

Figure 1:
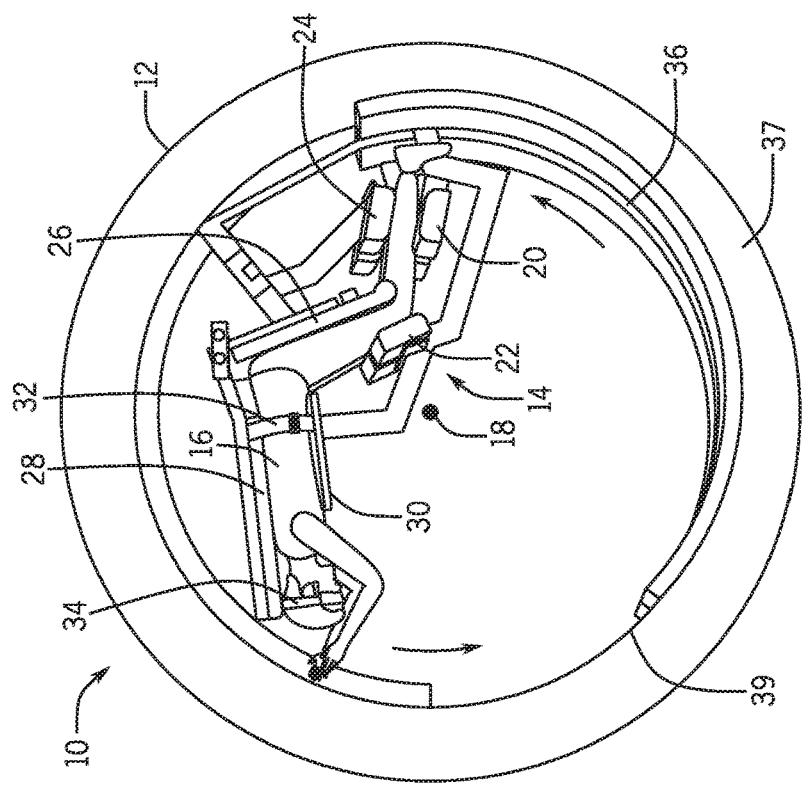
FIG. 1 is a side view of an amusement ride restraining a passenger within an annular structure, in accordance with present techniques.

FIG. 1 is a side view of an amusement ride 10 utilizing an annular structure 12 with a passenger support system 14 implemented within the annular structure 12. The passenger support system 14 may be designed to hold a passenger 16 in a seated or reclining position during movement (i.e. rotation) about a center axis 18. The forward-facing direction of the seated position may be co-planar to the annular structure 12 (i.e., looking at the inner side of the annular structure, for example, as depicted in FIG. 1) or orthogonal to the plane of the annular structure 12 (i.e., looking out the side of the annular structure 12). As would be appreciated, the passenger 16 may also be maintained in a prone, standing, kneeling, or other position, and the restraints may be configured relative to the annular structure 12 such that the passenger 16 may face towards or away from the center axis 18.

In one embodiment, the passenger support system 14 may include one or more restraints that hold the passenger 16 in place while the passenger support system 14 moves within the annular structure 12 while the amusement ride 10 is in operation. The restraints may include a calf restraint 20 and/or a knee restraint 22 that, in certain embodiments, may contribute a majority of a total restraining force of the passenger support system 14. For example, the calf restraint 20 and/or knee restraint 22, may make up 55%, 65%, 75%, 85% or 100% of the restraining force of the passenger support system 14. Collectively, or each by themselves, the calf restraint 20 and the knee restraint 22 may also be referred to as leg restraints. The calf restraint 20 may hold the legs of the passenger 16 against a calf rest 24, and the knee restraint 22 may hold the thighs of the passenger 16 in the seat 26. The calf rest 24 and the seat 26 may also be considered components of the leg restraints. Accordingly, the restraining force may be a clamping force of the leg restraints exerted on the passenger 16. Additionally, a back rest 28 and chest restraint 30 may further hold the passenger 16 in a specified position. The chest restraint 30 may be configured as a plate or generally planar structure that, together with the back rest 28, forms an additional clamp-like structure on the chest. In one embodiment, the leg clamping force of the leg restraints exerted on the passenger 16 may be greater than a chest clamping force of the chest restraints exerted on the passenger 16. Collectively or each by themselves, the seat 26 and back rest 28 may also be referred to as rear restraints. In another embodiment, the chest restraint 30 and rear restraints may encompass the majority of the restraining force of the passenger support system 14. One or more restraining belts 32 may also be incorporated by directly holding the passenger 16 to the passenger support system 14, holding the restraints in place, or a combination of both. As would be appreciated, the leg restraints, back rest 28, chest restraint 30, and restraining belts 32 may collectively or each by themselves be referred to as the restraints, and may be padded and/or covered in a comfortable material to aid in passenger enjoyment.

The restraints of the passenger support system 14 may actuate to allow efficient ingress and egress from the amusement ride 10 and sufficient restraining force. For example, the calf restraint 20, knee restraint 22, and chest restraint 30 may clamp downward onto the passenger 16 in a clamshell style motion. The restraints may pivot together as one, or multiple pivot points may be employed allowing each restraint to contact the passenger 16 separately. In another embodiment, the restraints may clamp straight down in a press type motion. Actuation may be hydraulically, mechanically, spring, or manually actuated or a combination thereof. It should also be understood that the restraints may be altered in shape, size, number, position, and/or actuation depending on the amusement ride 10 implementation. The passenger support system 14 may include a frame 33 that couples the passenger support system 14 to a passenger support base 35 that in turn is configured to move relative to and along a path 36 on a surface 37 of the annular structure 12. For example, the path 36 may be a channel into which a portion of the passenger support base 35 extends, or the path 36 may be a track on which the passenger support base 35 travels. While in the depicted embodiment the path 36 is positioned along an interior surface of the annular structure 12, it should be understood that in other embodiments the passenger support system 14 may be coupled to a passenger support base 35 that moves along a lateral or exterior surface of the annular structure 12.

Figure 2:
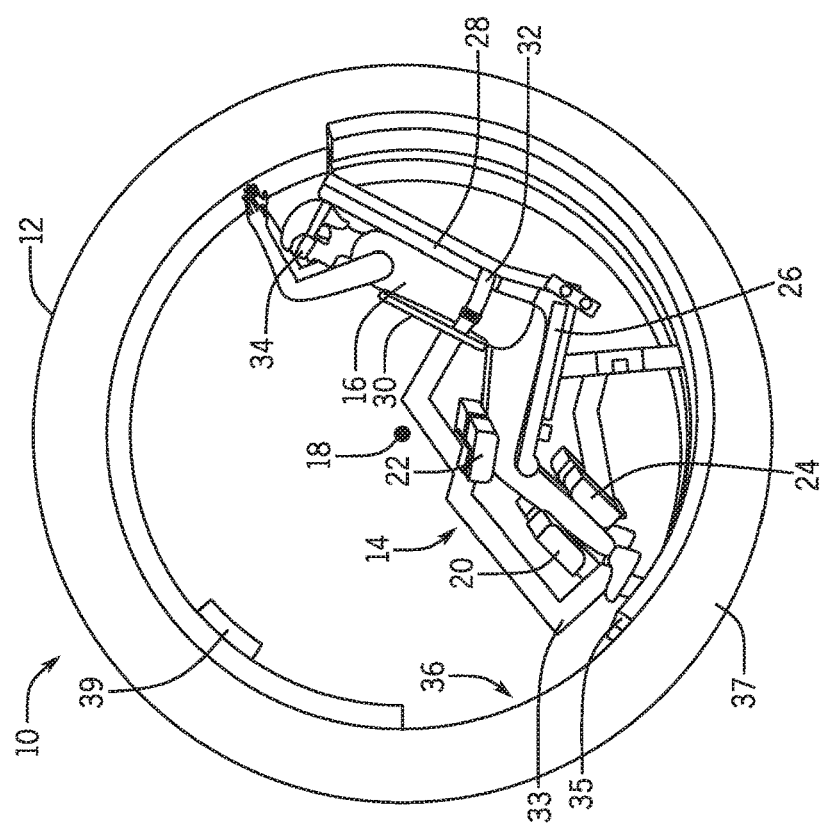
FIG. 2 is a side view of an amusement ride restraining a passenger in an inverted position within an annular structure, in accordance with present techniques.

Once secured with the passenger support system 14, the passenger 16 may be subjected to movement around the center axis 18 of the annular structure 12 along the path 36, which forms at least a partial annulus along the annular structure 12. FIG. 2 shows the passenger support system 14 rotated within the annular structure 12 in a configuration that may simulate flying, flipping, etc. In certain embodiments, a virtual reality (or augmented reality) device, such as a visual effect device 34, may be employed to enhance the experience of the passenger 16 by providing a visual and/or audio effects to the passenger 16. Such a visual effect device 34 may be implemented as a worn headset, e.g., a helmet, visor, or glasses. The visual effect device 34 may include a display that displays images that enhance the movement of the passenger support system 14. The images may be provided by a ride control system, as provided herein, and may be selected to align with the movement of the passenger 16.

In particular embodiments, the visual effect device 34 (e.g., virtual reality goggles) immerses the passenger 16 in a ride narrative and may be used instead of or in addition to a projection screen, a view of which may be blocked by the annular structure 12. Accordingly, the visual effect device 34 may permit immersive experiences even in the context of complex passenger support or movement structures. The amusement ride 10 may alternatively or additionally include additional special effects capabilities. For example, a screen 39 and/or speaker, which may utilize one or more audio/visual technologies (e.g., LCD, LED, OLED, projection, dynamic speakers, woofers, 3D, 4D, etc.) may be coupled to the annular structure 12. The screen 39 may move in conjunction with the passenger support system 14 such that the screen 39 is always oriented in the natural direction of the passenger's gaze.

The rotational motion, as shown by the transition between FIG. 1 and FIG. 2, may be achieved by moving the passenger support system 14 along the path 36 within the annular structure 12. This may include flipping the passenger 16 upside down during the course of one revolution. The nature and speed of the rotation may be selected based on the desired sensation. For example, the passenger support system 14 may be held for a period of time in the flipped position as in FIG. 2 to simulate flying. To simulate flipping or somersaulting, a full rotation may be completed in a single motion sequence. The rotation may be designed to rotate in one direction (e.g., clockwise) or be bi-directional (e.g., both clockwise and counter-clockwise). Additionally, the passenger support system 14 may be stopped at any point around the center axis 18 to induce a desired effect on the passenger 16. The path 36 may act as a guide for keeping the passenger support system 14 in line with the annular structure 12, and may be implemented as a channel or groove. One or more motors, geared assemblies, or electromagnetic conductors may make up a motorized system to spin the passenger support system 14 around the central axis 18, and may be contained within the path 36, located on the exterior of the annular structure 12 or passenger support system 14, or a combination thereof.

Figure 3:
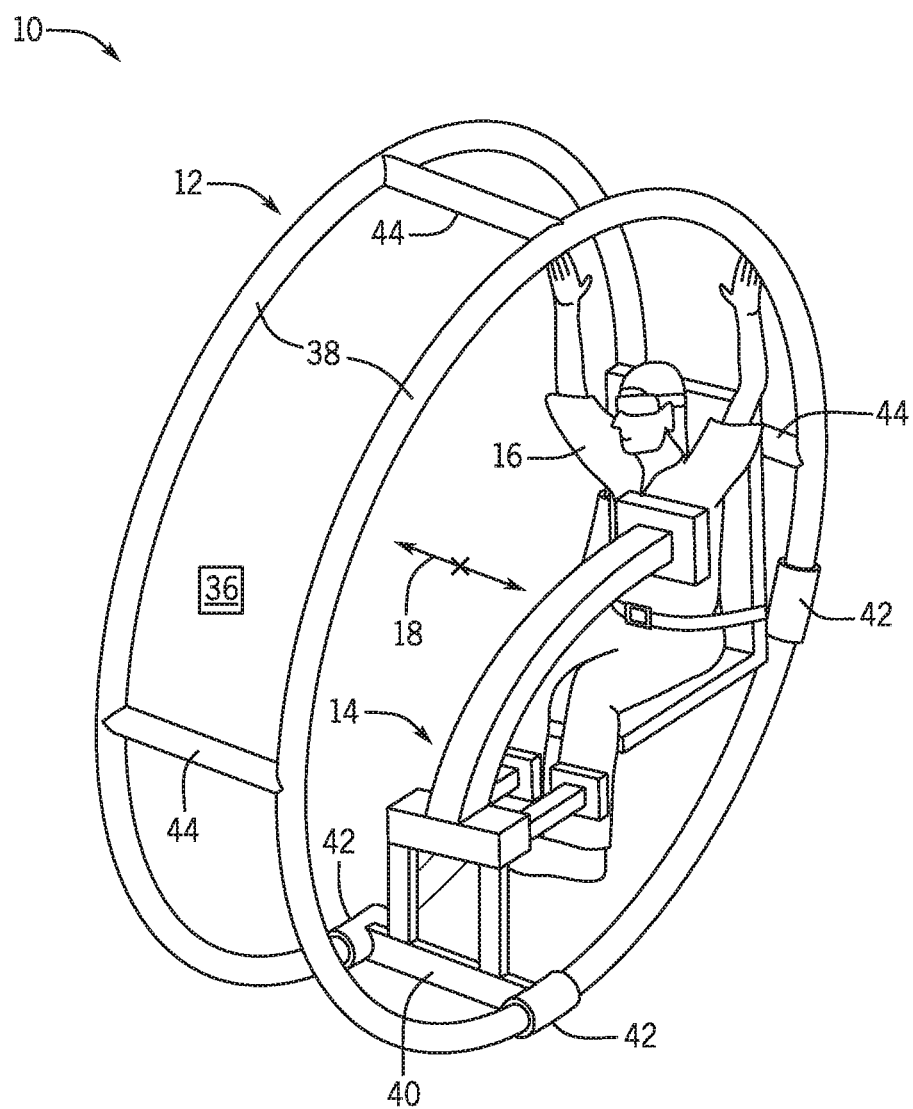
FIG. 3 is a perspective view of an amusement ride depicting a passenger within an annular structure of a multi-rail configuration, in accordance with present techniques.

FIG. 3 illustrates an arrangement of the annular structure in which the path 36 is defined by one or more annular rails 38 relative to which the passenger support system 14 may move. While the depicted embodiment shows two co-axial annular rails 38, it should be understood that more or fewer may be employed. Further, in certain embodiments, the annular rails 38 are configured with a gap between that permits the passenger 16 an unobstructed view of a projector screen (e.g., dome screen 52 of FIG. 4). The passenger support system 14 may be coupled to the annular rails 38 via tie rods 40 and rail brackets 42. The rail brackets 42 couple the passenger support system 14 to the annular rails. In addition to supporting the passenger support system 14, the tie rods 40 may also assist in holding the annular rails 38 together along with multiple cross bars 44. Although multiple components of the annular structure 12 may function primarily for structural integrity, (i.e., the cross bars 44), graphics, screens, or other amusement ride 10 effects may be incorporated into or on them for an enhanced passenger experience.

In some embodiments, bushings, bearings, wheels, or a low friction material may be utilized to allow the sliding motion of the passenger support system 14 on the annular structure 12. To offset the weight of the passenger 16 and the passenger support system 14 during motion, one or more counter weights may be employed around the annular structure 12 and rotate with the passenger support system 14. Furthermore, the passenger support system 14 may be directly connected to the annular structure 12 via a motorized system to facilitate movement.

Although the annular structure 12 may be utilized in a single-passenger ride, a multi-passenger embodiment may also be employed to facilitate groups of passengers 16 at one time. For example, a single annular structure 12 may include multiple passenger support systems 14 and/or be implemented in a ride system including one or more other annular structures 12. One embodiment, shown in FIG. 4, includes one or more rows of annular structures 12. These rows may be offset vertically and/or horizontally to allow better views for the passengers 16. Such an offset may come in the form of row stacking. The passenger support system 14 may include stacked passenger rows such that a rear row is positioned either higher or lower, relative to the ground, than the front row. The multiple annular structures 12 may be held by a support structure 46 and implemented sitting on the ground, or suspended from the ceiling 47 via a rigging 48. The rigging 48 may use cables, chains, pulleys, motors, or other suspension equipment to support and/or move the annular structure 12. Additionally, an actuator assembly 50, e.g. a rotator ring, may be utilized instead of, or in conjunction with, the rigging 48 to facilitate desired movements of the annular structure 12. An articulating arm 51 may control the movement of the rear and front row relative to one another and the ground.

The rigging 48 and/or actuator assembly 50 give the annular structures 12 up to six degrees of freedom of movement. The passenger support systems 14 within the annular structures 12 can also spin about the center axis 18. The passenger 16 can be subjected to translational movements on the x, y, or z axis, rotational movements about the x, y, or z axis, or a combination thereof. It will also be appreciated that a support structure 46, rigging 48, actuator assembly 50, and articulating arm 51, may also be utilized for a single rider experience. In certain embodiments, a canopy 49 or other element may be employed to shield certain structural components of the support structure 46, rigging 48, actuator assembly 50, and/or the articulating arm 51 from passenger view.

To help immerse the passenger 16 in the amusement ride 10, an audio/visual representation may be presented to the passenger 16. The representation may be displayed via a visual effect device 34, a dome screen 52, or a combination thereof to provide or enhance the simulated environment in the amusement ride 10. The dome screen 52 may be any suitable technology such as projection, LED, OLED, or LCD. In one embodiment, the annular structure 12 is suspended from a rigging 48 and the dome screen 52 is shown beneath and/or to the side of the passenger 16, such that the passenger 16 experiences being above the environment. In another embodiment, the dome screen 52 is positioned on the wall and/or ceiling above the passenger 16. In yet another embodiment, the dome screen 52 mostly or entirely encompasses the passenger 16 to further immerse the passenger 16 in the adventure experience. The dome screen 52 and/or the visual effect device 34 may also include 3D technology. The visual effect device 34 may be a headset worn by the passenger 16 or one or more screens placed within and/or just outside of the annular structure 12 or a combination thereof. For example, screens may be placed within and around the annular structure 12 while the passenger 16 wears 3D glasses.

The visual and/or aural representation presented to the passenger(s) 16 may also be synchronized to the movement of the passenger support system 14 via the control circuitry. For example, the visual effect device 34 and/or dome screen 52 may depict images that correlate to a simulated roll or somersault as seen from the view of a hypothetical character, and the passenger support system 14 may spin the passenger 16 to simulate the g-forces of a plane doing a somersault.

Customization of the amusement ride 10 for different groups or individual passengers 16 may also be done to maximize the interest and comfort of first-time and repeat passengers 16. In one embodiment, passengers 16 may vote or provide input individually or as a group prior to boarding to determine, for example, a theme for the amusement ride 10. The theme may, in turn, be used as an input for ride audio/visual effects and/or motion effects. In single-passenger rides, or if individual visual effect devices 34 are being utilized in a multi-passenger ride, each passenger 16 may select an adventure from a list of premade adventures or design their own. In other embodiments, all passengers 16 are presented with the same audio/visual effects and/or adventure. Alternatively or additionally, both single and multi-passenger rides may have individual adjustments for the motion felt by each passenger 16. For example, certain passengers may experience higher g-forces relative to other passengers 16, based on user profile or user selection.

Additionally, the images depicted by the visual effect devices 34 may be controlled by each passenger 16 by utilizing controls located within the annular structure 12. Each passenger 16 may also have a "stop motion button" to limit or stop motion of their respective passenger support systems 14 should they feel uncomfortable during the amusement ride 10. Additionally, due to the various motions and g-forces the passenger 16 may be subjected to, arm restraints may be employed to keep the passenger's arms from moving beyond a desired area. In such a case, the arm restraints may leave enough mobility so the passenger 16 may still operate the amusement ride 10 controls. Additionally or alternatively, padded arm rests and shields may be utilized to contain passenger arm movement.

In one embodiment, the passenger support system 14 may include one or more handles extending in-front of or beside the passenger 16. The handles may allow the passenger 16 to rest his/her arms or hold on to the passenger support system 14 during operation of the amusement ride 10. In certain embodiments, the handles may be movable and/or be part of the controls for an individual experience. For example, during operation of the amusement ride 10, moveable handles may allow the passenger 16 to feel as if he or she is driving a motorcycle, flying a plane, a glider, or any other suitable transportation device. Further, present embodiments may include sensing/haptic mechanisms on the handles that communicate with the control circuitry to translate feedback from the sensors into movement of the passenger support system 14 for an enhanced simulator experience.

Figure 5:
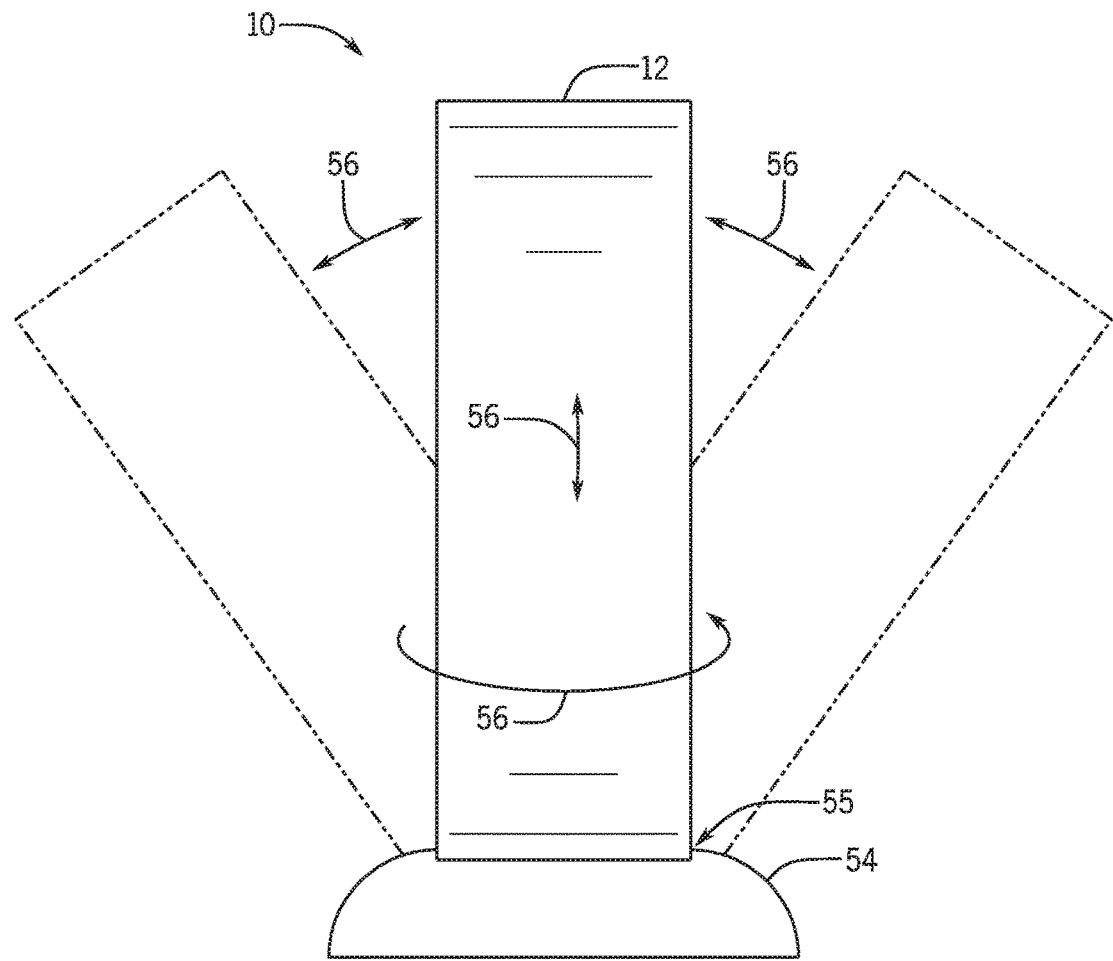
FIG. 5 is a schematic view of an amusement ride including an annular structure with an articulating base, in accordance with present techniques.
Figure 6:
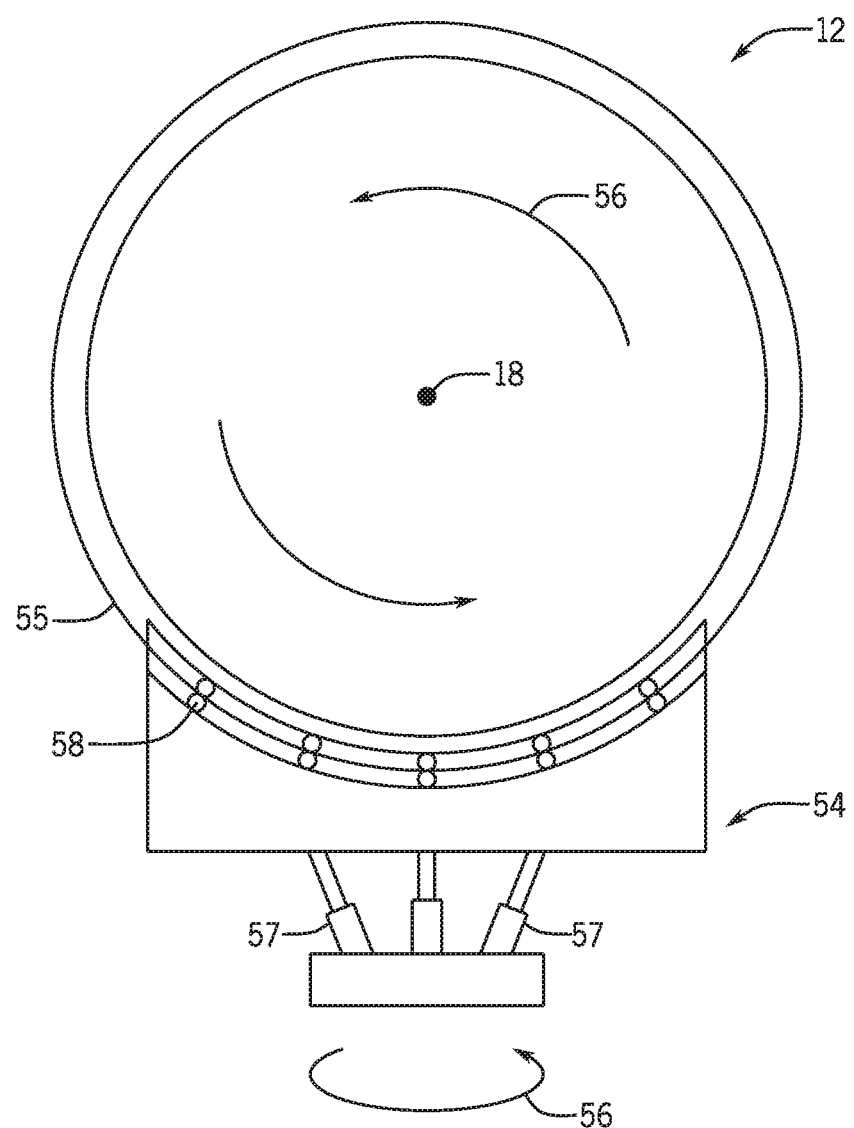
FIG. 6 is a schematic view of an amusement ride including an annular structure and articulating base of FIG. 5, in accordance with present techniques.

While the annular structure 12 as provided herein may permit rotation of a restrained passenger 16 relative to the annular structure 12, the annular structure 12 itself may also move to create more complex motion patterns and sensations for the passenger 16. As stated above, the annular structure 12 may be employed on the ground or suspended from a rigging 48. In either case, an articulating base 54, as shown in FIG. 5, coupled to the annular structure 12 (e.g., on an exterior surface 55) may facilitate certain rotational movements of the annular structure 12 relative to the articulating base 54, as shown by reference arrows 56. As would be appreciated, the articulating base 54 may be mounted on the ground, ceiling, or a bogie, suspended from a rigging 48, or in a wall mount configuration depending on the amusement ride 10 implementation. As shown in FIG. 6, the articulating base 54 may include one or more actuators 57 to assist in tilting or rotating the annular structure 12. In some embodiments of the amusement ride 10, the passenger support system 14 may be fixed relative to the annular structure 12. In this case, the entire annular structure 12 may be rotated about the center axis 18 by the articulating base 54. For example, the annular structure 12 may have a lip along the exterior surface 55 coupled to one or more rollers 58. The rollers 58 may hold the annular structure 12 to the articulating base 54 and/or provide a driving force to rotate the annular structure 12 about the center axis 18.

Figure 7:
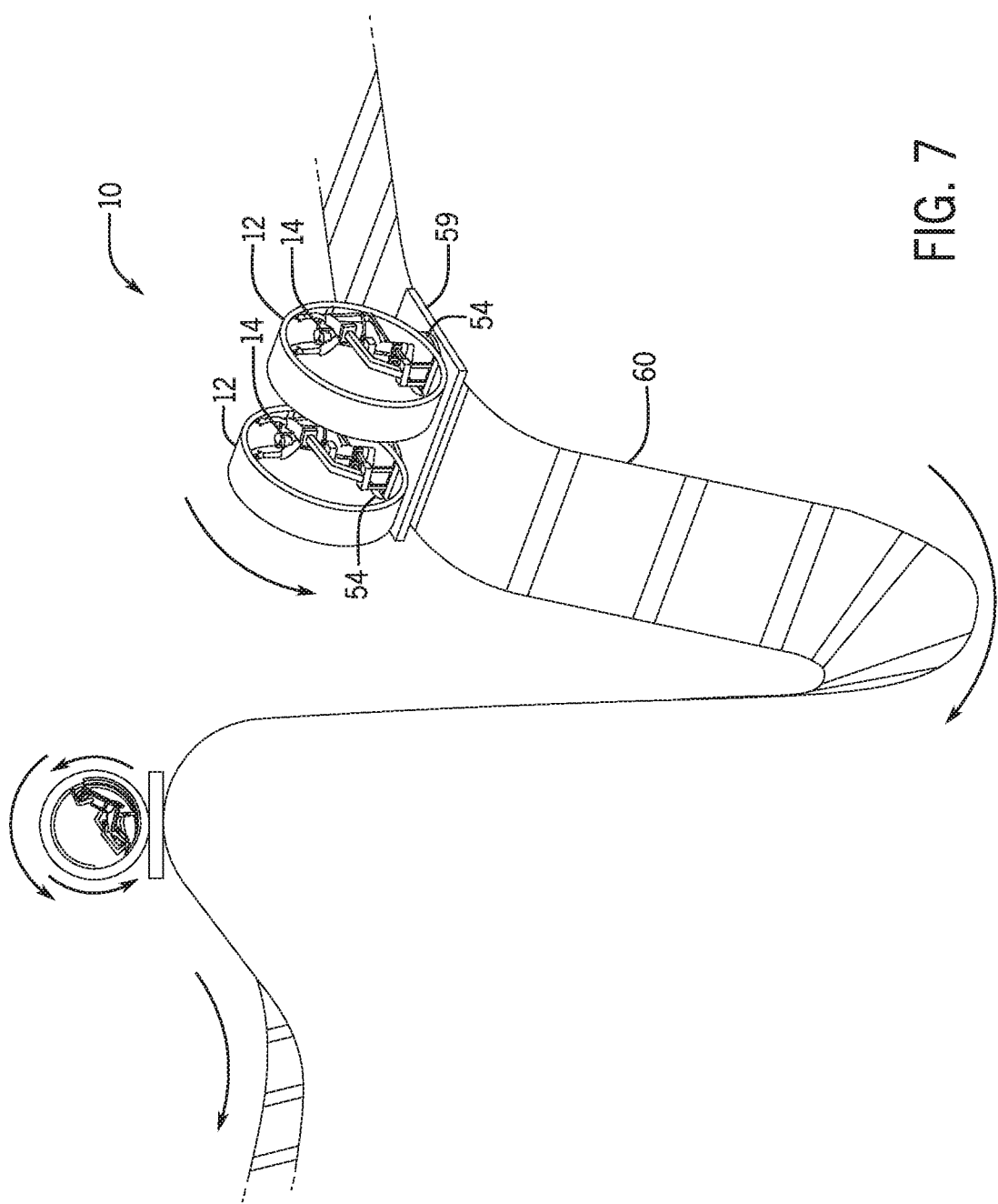
FIG. 7 is a perspective view of an amusement ride including annular structures on a bogie and track, in accordance with present techniques.

The articulating base 54 may also be part of a transport system that supports and moves the annular structure 12 along a path of the amusement ride 10. As would be appreciated, the amusement ride may utilize a transport system without an articulating base 54. The transport system may simply facilitate moving the annular structure 12 from one room to another or provide a coaster type experience. The transport system may include a cart 59 (e.g., a bogie) that couples one or more annular structures 12 to a track 60, as depicted in FIG. 7. The track 60 may facilitate translational movement while the annular structure 12 and/or articulating base 54 facilitate rotational motions of the passenger support system 14. The cart 59 may utilize motors, electromagnetic forces, brakes, compressed air, cables or any suitable system to initiate or continue movement along the track 60. Additionally, the dips, rises, and/or turns of the track 60 may induce forces that cause rotational motions of the passenger support system 14 without the activation of a motorized system. The induced forces may be utilized in conjunction with brakes and/or the motorized system to reduce or accentuate the movement felt by the passenger 16.

Additionally, the track 60 may support the use of multiple carts 59 at one time, thus allowing for a continuous flow of passengers 16 to board and exit the amusement ride 10. Also, the cart 59 may include multiple annular structures 12 to allow multiple passengers 16 to experience the amusement ride 10 at once. For example, each cart 59 may have two side-by-side annular structures 12. Multiple carts 59 could also be linked together to form a train. However, the amusement ride 10 may include any suitable number of annular structures 12 or carts 59. The annular structures 12 may be arranged in a manner that allows each passenger 16 to have a desirable field of view of the environment. For example, in some embodiments, trailing carts 59 in a train may be taller than previous carts 59 or offset horizontally to facilitate better views of the environment.

In some embodiments, a visual effect device 34, dome screen 52, speakers, or other audio/visual devices may be supplemented or replaced by physical effects and displays such as sculptures, posters, facades, water effects, temperature changes, optical illusions, etc. Physical effects and displays may be particularly important when a transport system is utilized, as it may not be practical in some cases to position screens all along the track 60. Furthermore, physical effects and displays may give the passenger 16 an even more realistic experience over virtual effects. Physical effects and displays may also be utilized to cover structural components or give the passenger 16 the opportunity to physically touch the environment. As would be appreciated, physical effects are not limited to embodiments that include a track 60.

Figure 8:
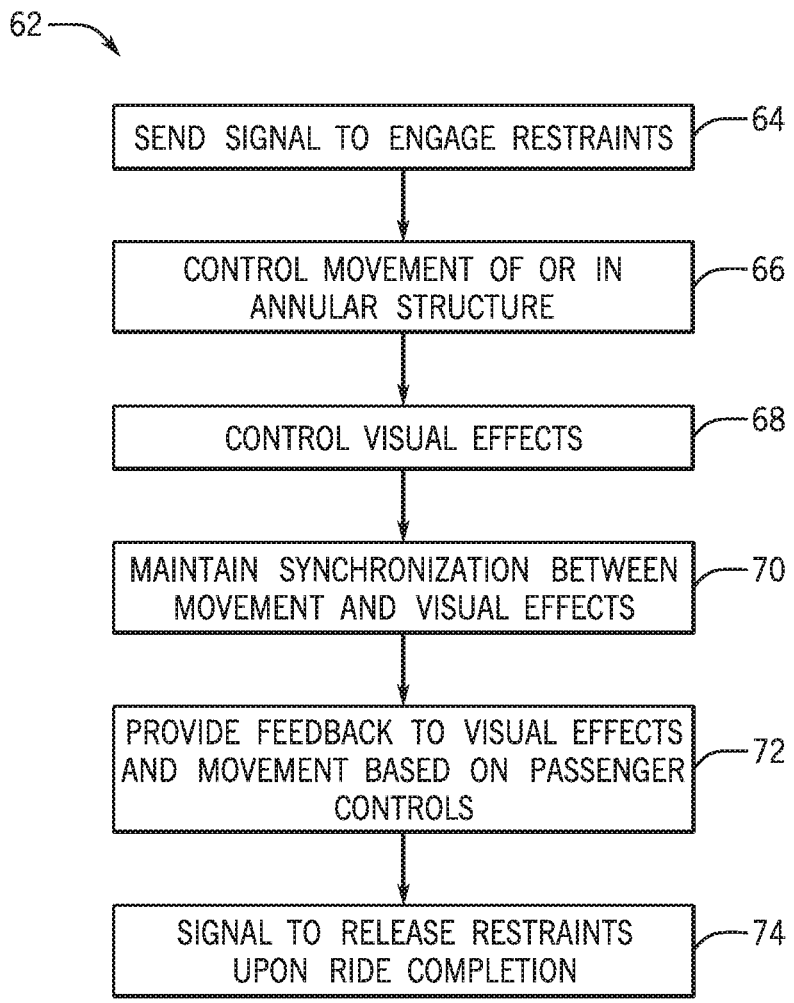
FIG. 8 is a flow chart depicting a process of operating an amusement ride, in accordance with present techniques.

FIG. 8 depicts a flow chart of a process 62 of one embodiment of the amusement ride 10. Certain steps may be automatically controlled by the control circuitry, or individually actuated by the passenger 16 or a ride attendant. As indicated by process block 64, signals are sent to engage the restraints before the amusement ride 10 begins. At this time, the visual effect device 34, if equipped, would also be secured to the ride or passenger 16. The restraints may remain engaged and locked throughout the duration of the amusement ride 10. At block 66, the ride 10 controls the movement of or in the annular structure 12, which may be movement of the passenger support system 14 within the annular structure 12. Additionally, as shown in process block 68, the visual effects of the ride 10 may be controlled during the ride 10. The controlled visual effects may include display on dome screens 52, visual effect devices 34, physical effects, physical displays (e.g., a physically moving object), or other displays. The control circuitry may also maintain a synchronization between the movement of the passenger support system 14 and the visual effects as stated in process block 70. For example, audio and visual effects portraying a rocket taking off may be provided to a passenger 16 while simultaneously spinning the passenger 16 such that the forces felt by the passenger 16 simulate what is being shown.

Furthermore, at block 72, the method may incorporate feedback from the passenger controls on the movement and visual effects. As the passenger 16 is being subjected to the movement and visual effects, he or she may wish to take control of the adventure and change what is happening. For example, a passenger may push an acceleration control, and be presented with g-forces that simulate acceleration. Feedback may also come as a change in the visual effects. For example, if the passenger 16 is wearing a visual effect device 34 and turns his or her head up, down, left, or right, the visuals may change based on the direction the passenger 16 is looking. If the passenger 16 looks to the right or up, the visual may pan right or up accordingly. Feedback programmed by the passenger 16 or ride attendant prior to or at the start of the amusement ride 10 may also be incorporated throughout the ride.

At the conclusion of the amusement ride 10, signals are sent to release the restraints and/or locks holding the passenger 16 in the passenger support system 14 in process block 74. Although the flow chart 62 is shown in a given order, it should be appreciated that in certain embodiments, portions of the flow chart may be reordered, deleted, and/or occur simultaneously.

Figure 9:
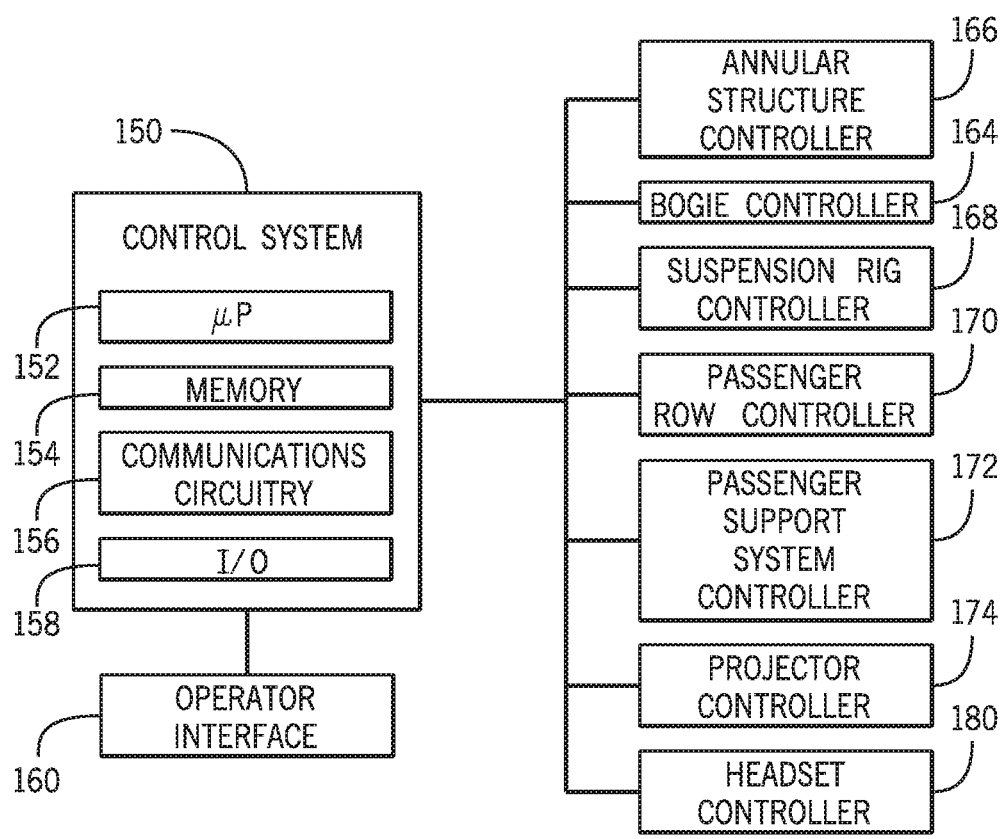
FIG. 9 is a block diagram of the amusement ride, in accordance with present techniques.

The amusement ride 10 may operate under a control system 150, as shown in the block diagram of FIG. 9. The control system 150 may include a processor 152, which may include one or more processing devices, and a memory 154 storing instructions executable by the processor 152. The memory 154 may include one or more tangible, non-transitory, machine-readable media. By way of example, such machine-readable media can include RAM, ROM, EPROM, EEPROM, optical disk storage, magnetic disk storage or other magnetic storage devices, or any other medium which can be used to carry or store desired program code in the form of machine-executable instructions or data structures and which can be accessed by the processor 152 or by any general purpose or special purpose computer or other machine with a processor. The control system 150 may also include communications circuitry 156 and/or input and output circuitry 158 to facilitate communication with other components of the simulator ride 10. In addition, the control system 150 may be coupled, either directly or wirelessly, to an operator input device or operator interface 160 that, in operation, may be used by a ride technician to provide input used to control one or more ride features. The operator interface 160, or other components of the ride 10, may be located remotely from the control system 150 in certain embodiments and may be, for example, implemented on a mobile device. Further, certain elements of the control system 150 (e.g., the processor 152, memory 154, communications circuitry 156, I/O 158) may also be present in other depicted controllers of the amusement ride 10.

Figure 4:
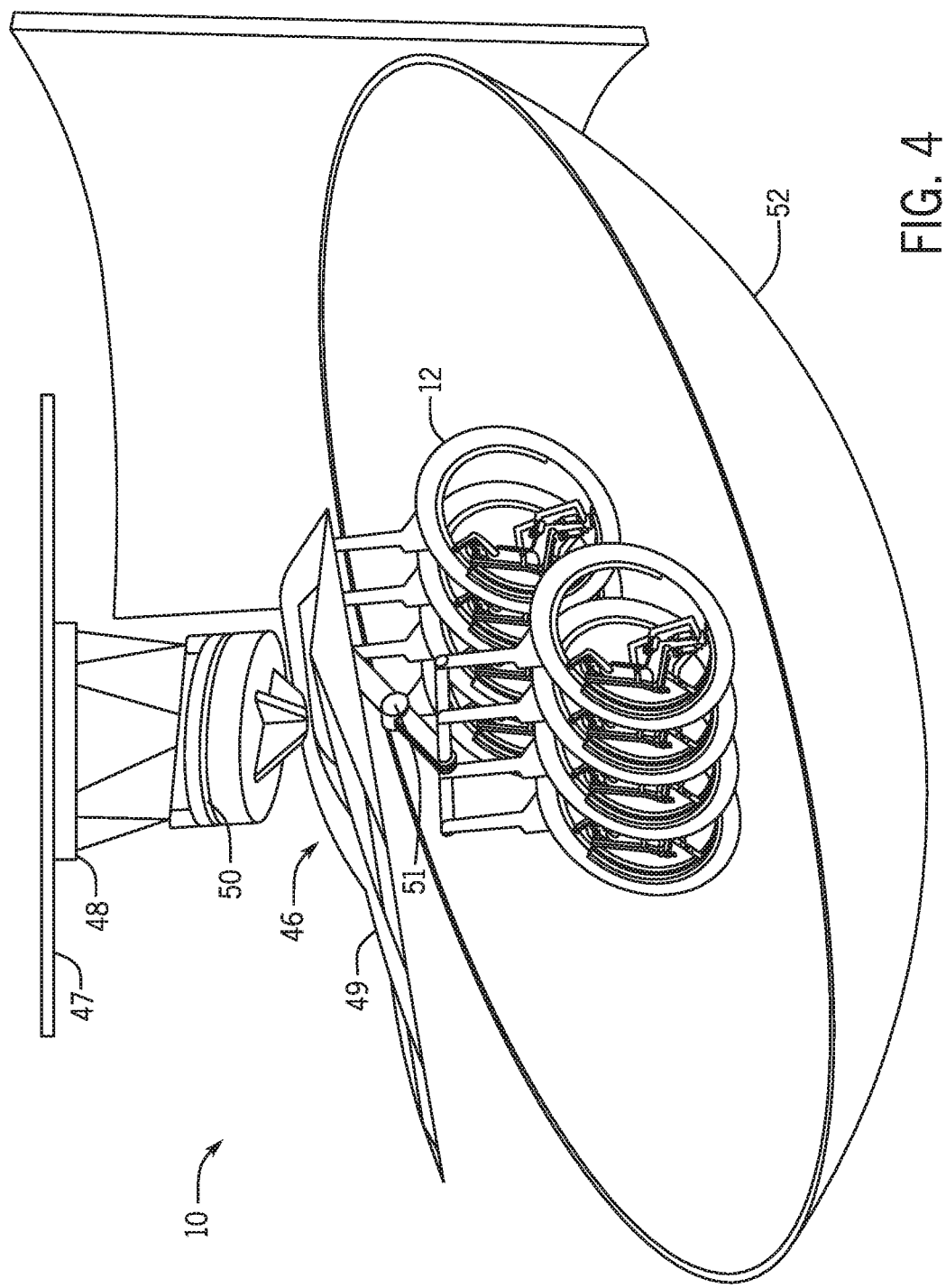
FIG. 4 is a perspective view of a multi-passenger amusement ride including multiple annular structures, in accordance with present techniques.

In operation, the control system 150 may control movement of one or more components of the amusement ride 10. It should be understood that the depicted embodiment is by way of example, and certain embodiments may omit or combine depicted elements. For example, the control system 150 may communicate with and provide instructions to an annular structure controller 166 to control movement of the annular structure 12. In embodiments in which the annular structure moves along a track (e.g., as shown in FIG. 4 and FIG. 7), the control system 150 provides instructions to a bogie controller 164 to control velocity and/or braking. The control system 150 may also control certain motion via control of a suspension rig controller 168, e.g., that controls a rotator ring controller and one or more cable movements. In addition, the control system 150 may also provide instructions to a passenger row controller 170 to control positioning of the passengers and movement of a row of annular structures 12 relative to one another. The passenger support system controller 172 may be configured to communicate with the control system 150 to generate signals that restraints are in place, to provide passenger input (e.g., before or during the ride), or to provide drive signals that drive a motor of the passenger support system 14 to cause the passenger support system 14 to move relative to the annular structure 12, etc.

In yet another embodiment, the control system 150 may provide instructions to one or more special effects controllers, such as a headset controller 180 (e.g., to control circuitry in visual effect devices 34 such as helmets or glasses or to cause audio or visual effects) and a projector controller 174. The control system 150 may be configured to independently address individual annular structures 12 for individual control of effects, e.g., each visual effect device 34 and passenger support system 14/annular structure 12 may be capable of providing unique and separate effects relative to other passenger support systems 14/annular structures 12. The control system 150 may also provide synchronization between the effects (i.e., the signals provided to the controllers are coordinated simultaneously).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A simulator ride comprising:
an annular structure comprising a path integrated with the annular structure, wherein the path is arranged along at least a portion of the annular structure to form at least a partial annulus;
a headset comprising a display and configured to be worn by a passenger; and
a passenger support system coupled to the path and configured to move along the path of the annular structure to rotate the passenger support system about a center axis of the annular structure when the simulator ride is in operation, wherein the passenger support system comprises a clamp-style leg restraint and a rear restraint separate from the clamp-style leg restraint, wherein the clamp-style leg restraint is configured to pivot about the central axis toward the rear restraint to move the clamp-style restraint from an unrestrained configuration to a restrained configuration, and wherein the simulator ride is configured to articulate the annular structure in one or more degrees of freedom.

2. The simulator ride of claim 1, wherein the passenger support system is configured to maintain the passenger in a seated position such that the passenger is positioned between a center of the annular structure and the rear restraint.

3. The simulator ride of claim 1, wherein the passenger support system comprises a chest restraint configured to form a clamp-like structure with the rear restraint.

4. The simulator ride of claim 3, wherein a leg clamping force of the leg restraint is greater than a chest clamping force of the chest restraint on the passenger.

5. The simulator ride of claim 1, wherein the headset is configured to provide images on the display, wherein the images are synchronized with a movement of the passenger support system.

6. The simulator ride of claim 1, wherein the headset is a virtual reality device.

7. The simulator ride of claim 1, wherein the path is arranged along an interior surface of the annular structure.

8. The simulator ride of claim 1, wherein the passenger support system is configured to rotate clockwise and counterclockwise.

9. The simulator ride of claim 1, wherein images displayed on the headset are selected based on a user input.

10. An amusement ride comprising:
an annular structure;
a ride base configured to support the annular structure and configured to articulate the annular structure in one or more degrees of motion; and
a passenger support system coupled within the annular structure and configured to rotate about a center axis of the annular structure, wherein the passenger support system is configured to maintain a passenger during a rotation of the passenger support system, and wherein the passenger support system comprises a clamp-style leg restraint configured to secure a passenger within the passenger support system, wherein the clamp-style leg restraint comprises a pivoting arm, a first leg pad, and a second leg pad, wherein each of the first leg pad and the second leg pad are coupled to the pivoting arm such that the first leg pad and the second leg pad are longitudinally spaced apart along a length of the pivoting arm.

11. The amusement ride of claim 10, wherein the one or more degrees of motion comprises a translational motion or a rotational motion.

12. The amusement ride of claim 10, wherein the passenger support system is fixed to the annular structure, and wherein the annular structure is configured to rotate about the center axis of the annular structure.

13. The amusement ride of claim 10, comprising a controller configured to stop the rotation at any of a plurality of positions about the center axis of the annular structure.

14. The amusement ride of claim 10, wherein the ride base is a rigging comprising a plurality of cables and configured to suspend the annular structure from above.

15. The amusement ride of claim 10, wherein the ride base comprises a bogie.

16. A multi-passenger simulator ride comprising:
a plurality of annular structures;
a corresponding plurality of headsets configured to receive signals and display images based at least in part on the received signals; and
a corresponding plurality of passenger support systems, each coupled to one of the plurality of annular structures, and each configured to rotate within one of the plurality of annular structures about a center axis, wherein each of the plurality of passenger support systems comprises:
a leg restraint comprising one or more leg pads fixed to a movable arm; and
a rear restraint separate from the leg restraint and configured to support a passenger within a passenger support system of the plurality of passenger support systems, wherein the movable arm is configured to move relative to the rear restraint about the center axis, and wherein the leg restraint is configured to maintain the passenger against the rear restraint.

17. The multi-passenger simulator ride of claim 16, wherein the plurality of headsets are individually addressable by a controller and are configured to display different images to different passengers based on the received signals.

18. The multi-passenger simulator ride of claim 16, wherein the plurality of annular structures each comprise two co-axial circular rails, and wherein the passenger support system is positioned within an opening formed between the two co-axial circular rails.

19. The multi-passenger simulator ride of claim 16, wherein each headset of the plurality of headsets is a virtual or augmented reality device.

* * * * *